United States Patent [19]

Lepley et al.

[11] Patent Number: 4,777,435

[45] Date of Patent: Oct. 11, 1988

[54] DIGITAL TACHOMETER

[75] Inventors: Joseph M. Lepley; Richard D. Yohman, both of Youngstown, Ohio

[73] Assignee: Altronic, Inc., Youngstown, Ohio

[21] Appl. No.: 10,011

[22] Filed: Feb. 2, 1987

[51] Int. Cl.$^4$ .......................... G01D 3/48; G04F 8/00
[52] U.S. Cl. ..................................... 324/166; 364/565
[58] Field of Search ........................ 361/264; 364/565; 307/519, 353; 360/73; 324/166, 169, 160

[56] References Cited

U.S. PATENT DOCUMENTS 4,355,364 10/1982 Gudat .................................. 364/565
4,383,303 5/1983 Hoffman ............................. 324/166

Primary Examiner—Reinhard J. Eisenzopf
Assistant Examiner—Jose M. Solis
Attorney, Agent, or Firm—Webb, Burden, Ziesenheim & Webb

[57] ABSTRACT

A digital tachometer for an internal combustion engine includes a circuit for receiving a pick-up pulse having a frequency related to the rotation speed of the engine and outputting a wave shaped pick-up pulse. This circuit filters the pick-up pulses and regulates the filtered voltage to provide a d.c. output for powering the tachometer. A crystal controlled oscillator and divider provides update pulses at intervals of 1 to 10 seconds and provides sampling pulses at frequencies of 1 to 5 kilohertz. A display counter and driver counts speed pulses indicative of speed between update pulses and latches the count until the next update pulse. A numerical display displays the count currently latched in the display counter. A multiplier/divider recieves the pick-up pulses and divides them by the number of pulses per revolution to provide pulses indicative of the engine rotational speed. It also multiplies the pulses in a sampling phase locked loop by a factor corresponding to the period between update pulses to provide speed pulses to the display counter. The sampling phase locked loop is strobed by the sampling pulses produced by the crystal controlled oscillator. The multiplier/divider provides a d.c. output reference voltage indicative of speed in addition to the speed pulses.

6 Claims, 5 Drawing Sheets

DIGITAL TACHOMETER

FIELD OF THE INVENTION

This invention relates to a digital tachometer useful for monitoring a remotely located internal combustion engine or the like. Preferably, the tachometer is provided with an overspeed shutdown circuit. Prior devices for similar purposes are disclosed, for example, in U.S. Pats. Nos. 3,835,382; 3,818,342; 3,572,302; 3,636,545; 3,748,580; 3,965,669; 4,056,778 and 4,181,883. Only the last patent discloses a device suitable for low power remote operations.

SUMMARY OF THE INVENTION

It is an advantage according to this invention that a digital tachometer draws very low current under all operating conditions thereby enabling the powering from the pick-up pulses from the engine being monitored.

It is another advantgae that the tachometer can be easily adapted to operate from the ignition timing pulses of various engines (two-cycle or four-cycle and one to many cylinders).

It is a further advantage according to this invention that an output reference voltage indicative of engine speed is provided that is the same for the same engine speed no matter the type of engine.

It is a still further advantage that an overspeed set point can be easily adjusted and displayed in units such as RPM.

It is another advantage according to this invention that it will function accurately over a wide range of ambient conditions eliminating the need for bothersome calibration.

Briefly, according to this invention there is provided a digital tachometer for use with an internal combustion engine or the like. The tachometer comprises a circuit means for receiving a pick-up pulse the frequency of which is related to the rotational speed of the engine and for outputting a wave shaped pick-up pulse. This circuit further comprises a filter for filtering the pick-up pulses and for regulating the filtered voltage to provide a d.c. output for powering the remainder of the tachometer. A crystal controlled oscillator and divider circuit provides update pulses at spaced time intervals of about 1 to 10 seconds and provides precisely spaced sampling pulses at a frequency of about 1 to 5 kilohertz. A display counter and driver counts speed pulses indicative of speed between update pulses and latches the count until the next update pulse. A numerical display displays the count currently latched in the display counter. A multiplier/divider circuit receives the wave shaped pick-up pulses and divides them by the number of pulses per revolution to provide pulses indicative of the rotational speed of the engine. It also multiplies the pulses in a sampling phase locked loop by a factor corresponding to the length of the period between update pulses to thus provide speed pulses for application to the display counter. The sampling phase locked loop is strobed by the sampling pulses produced by the crystal controlled oscillator. The multiplier/divider circuit provides a d.c. output reference voltage indicative of speed in addition to the speed pulses which are each of equal duration and voltage but have varying intervals depending upon the speed of the engine.

Preferably, in the tachometer according to this invention the sampling phase locked loop comprises a counter for dividing the speed pulses by the multiplication factor of the phase locked loop and a phase comparator for receiving as inputs the divided pick-up pulses and the speed pulses divided by the multiplication factor. The comparator outputs a signal indicative of the frequency of the divided pick-up pulses and the phase difference between the two inputs. A filter smooths the comparator output to produce the output reference voltage. A filter is also provided for filtering the speed pulses to provide an analog feedback signal. A strobed comparison circuit has as inputs the output reference signal and the analog feedback signal. It compares the input signals thereto at the time it is strobed by each sampling pulse to output a speed pulse of constant duration and voltage if the analog feedback signal has dropped below the output reference voltage.

In one embodiment of this invention, the output reference signal is applied as one input to a second strobed comparison circuit strobed by the sampling pulses. The other input to the second strobed comparison circuit is a maximum speed reference voltage whereby when the output reference voltage exceeds the maximum speed reference voltage the second sampled comparator outputs a shutdown pulse. A circuit is provided to latch the shutdown pulse to provide a shutdown signal. Preferably, a switch is provided for applying the maximum speed reference voltage to the first strobed comparison circuit in place of the filtered output of the phase comparator whereby the numerical display will indicate the shutdown speed. A switch is provided for adjusting the maximum speed reference voltage.

DESCRIPTION OF THE DRAWINGS

Further features and objects and advantages of this invention will become apparent to those skilled in the art from a study of the following drawings and the description thereof in which.

DESCRIPTION OF THE PREFERRED EMBODIMENT

Figure 1:
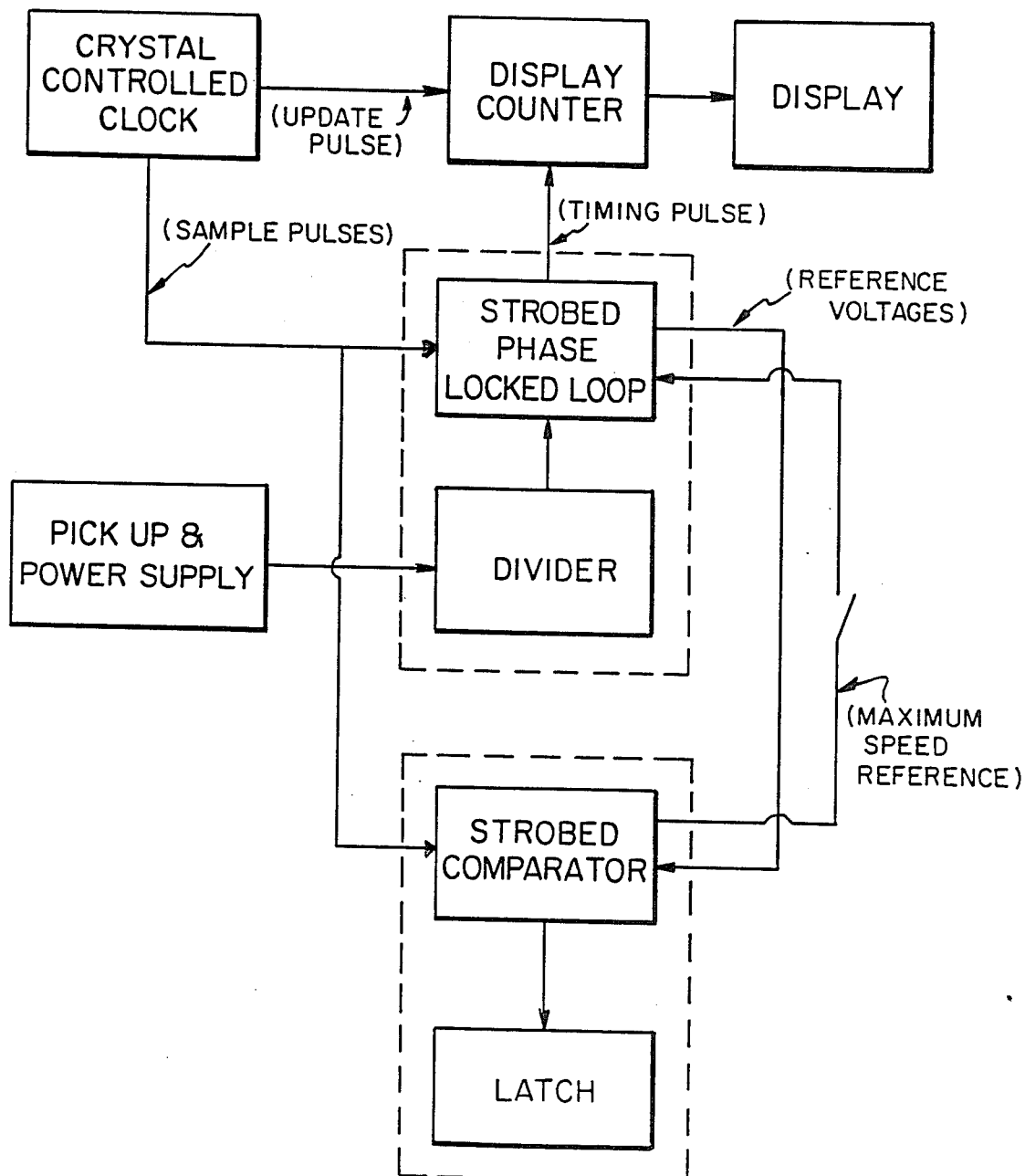
FIG. 1 is a function or block diagram showing the overall arrangement of the circuits according to this invention.

Referring now to FIG. 1, the tachometer according to this invention comprises a crystal controlled clock that generates a train of sampling pulses and a train of update pulses. The update pulses are applied to the display counter to set the update intervals. The sampling pulses are applied to a strobed comparator in the strobed phase locked loop and a strobe comparator in a shutdown circuit. The display counter counts speed pulses generated in the multiplier/divider circuit comprising the divider and the strobed phase locked loop. The display counter drives the numerical display. The pick-up and power supply circuit receives a pulse related to the speed of the engine and wave shapes this pulse for use by the multiplier/divider circuit. This circuit captures the energy of the pick-up pulses to provide a source of power for the entire circuit. The strobed phase locked loop generates a reference voltage indicative of rotational speed of the engine which is being monitored by the tachometer. The reference voltage may be applied to a strobed comparator where it is compared with a maximum speed reference signal for a shutdown circuit. The maximum speed signal may be applied to the strobed comparator in the phase locked loop to enable display of the maximum speed on the numerical display.

Figure 2:
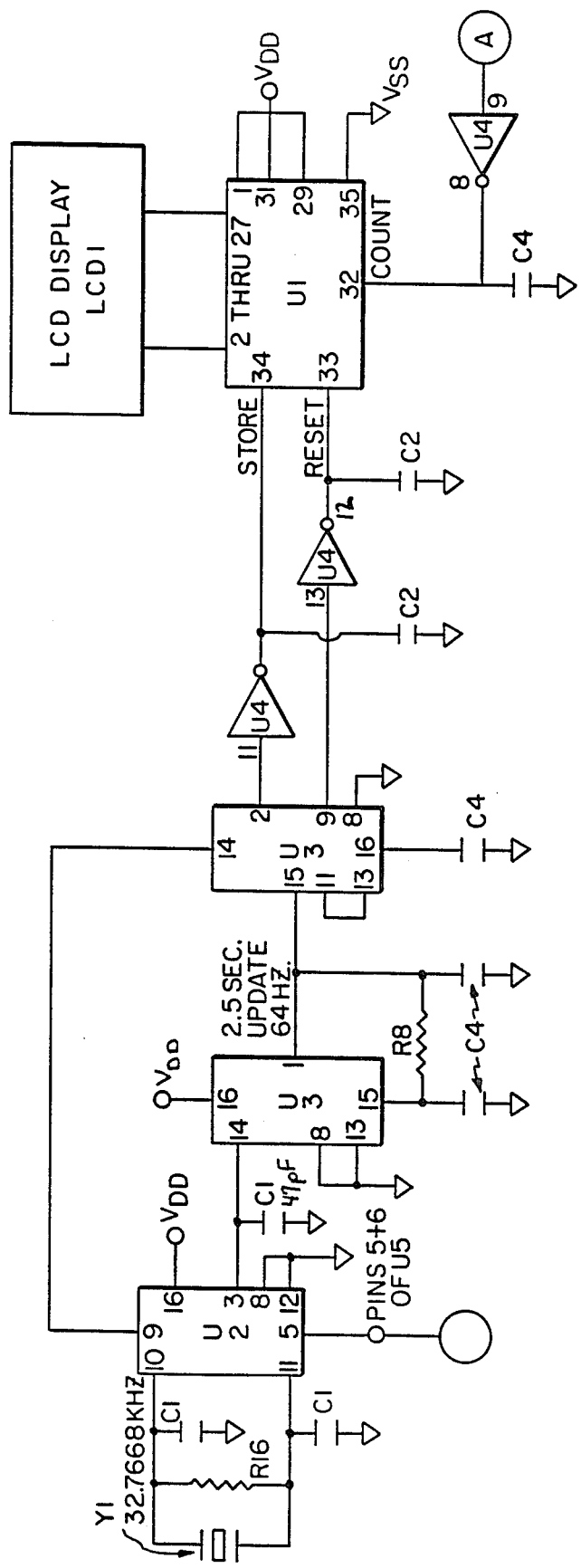
FIG. 2 is a detailed circuit diagram of the crystal controlled clock, the display counter and the numerical display according to one embodiment of this invention.

Referring now to FIG. 2, the programmable timer integrated circuit U2 is controlled by crystal Y1 (in this specific embodiment having a frequency of 32.768 kilohertz). The sampling pulse is available at pin 5 of U2 at a frequency of 1.024 kilohertz. The output at pin 3 is further divided by integrated circuit counter U3 to provide store and reset pulses of opposite polarity at intervals of 2.5 seconds. The store and reset pulses may be considered update pulses. The store and reset pulses are applied to integrated circuit display counter U1. The display counter in turn drives the LCD display LCD1. The display counter counts speed pulses applied through one inverter of integrated circuit U4. It should, of course, be understood that numerous integrated circuits are availabe to perform similar functions. For completeness, the integrated circuits used in the specific embodiment being described (including those to be referred to hereafter) are set forth in the following table.

| Item | Description |
|------|-------------|
| U1 | ICM7224IPL (Display Counter) |
| U2 | CD4060AE (Binary Counter/Divider) |
| U3 | MC14017BCP (Decade Counter/Divider) |
| U4 | MC14584BCP (Hex Schmit Trigger) |
| U5 | MC14011BCP (Quad Two-Input NAND) |
| U6 | MC14046BCP (Phase Locked Loop) |
| U7 | MC14066BCP (Quad Analog Switch) |
| U8 | ICM7240IPE (Programmable Timer) |
| U9 | LTC1040CH (Dual Micropower Comparator) |
| U10 | H11D2 (Optocoupler) |

Figure 3:
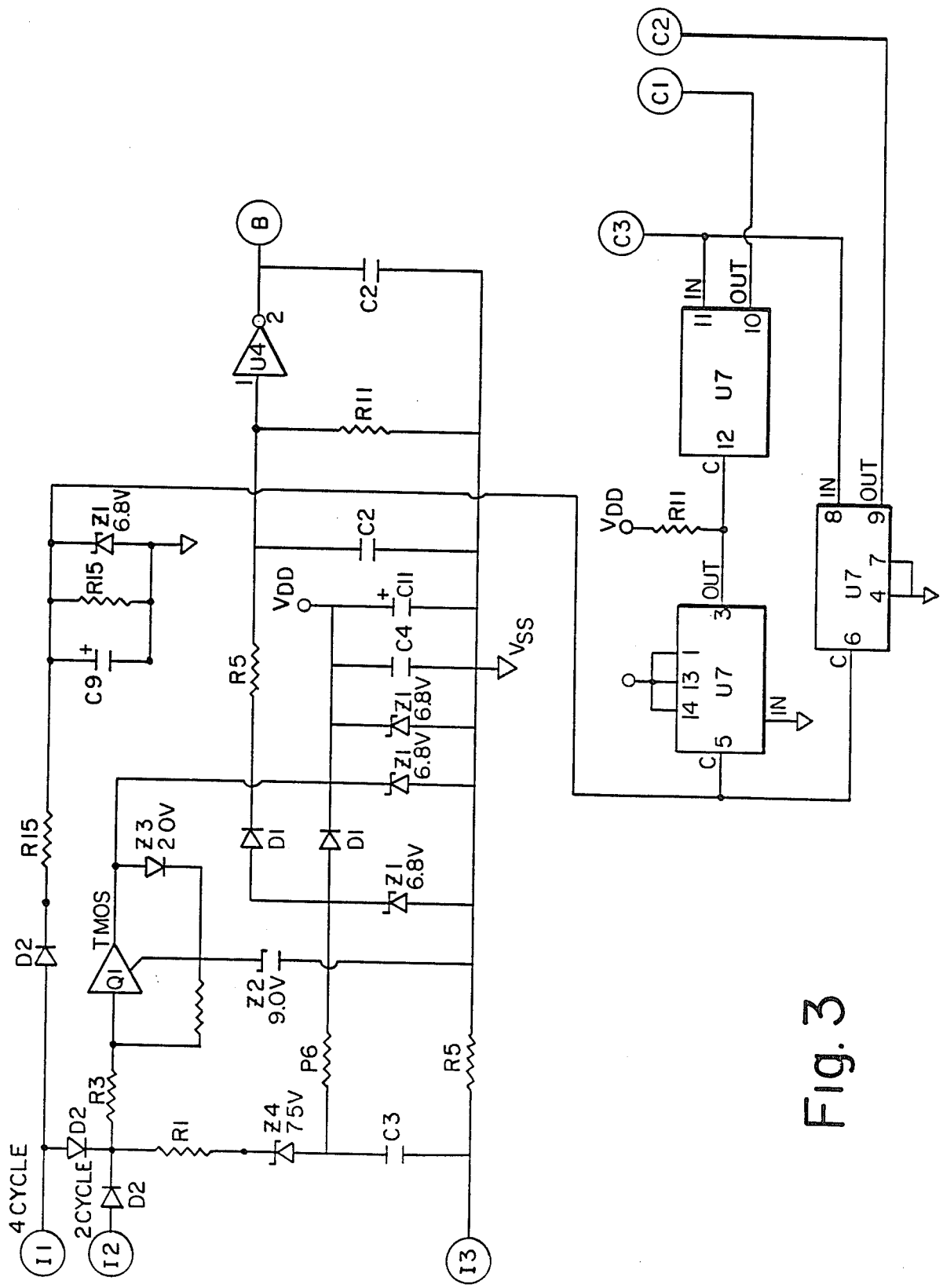
FIG. 3 is a detailed circuit diagram of the input and power supply circuit according to one embodiment of this invention.

Referring now to FIG. 3, a digital tachometer according to this invention may operate from a capacitor discharge ignition or other suitable signal source, such as a magnetic pick-up. The power supply derives both its speed signal and operating energy from the signal source. The input signal is connected to the appropriate input terminal IA or IB. In either mode the power for the circuit is provided through the field effect transistor Q1 which is operated as a series-pass voltage regulator. The field effect transistor and its associated circuit elements are necessary for the low power operation of this tachometer. The voltage regulator regulates the input ranging from 100 to 400 volts and consumes only 4 to 18 microamps, respectively. The pick-up signal is passed through zenor diode Z1 only when it exceeds the 75 volt breakdown to prevent the tachometer from responding to noise. The pulse is wave shaped by the remaining passive elements and the inverter which is part of integrated circuit U4 for application to the multiplier/divider circuit. Typically, where the tachometer is used with a capacitive discharge ignition circuit the pulse is applied to the multiplier/divider circuit each time the ignition circuit fires and the input drops to zero. The three analog switches U7 control the multiplication factor to be used in the multiplier/divider circuit depending upon whether the engine being monitored is a four-cycle or two-cycle engine (more accurately a four stoke per cycle or a two stroke per cycle engine). If the signal at C1 is high, the signal at C2 is low and vice versa.

Figure 4:
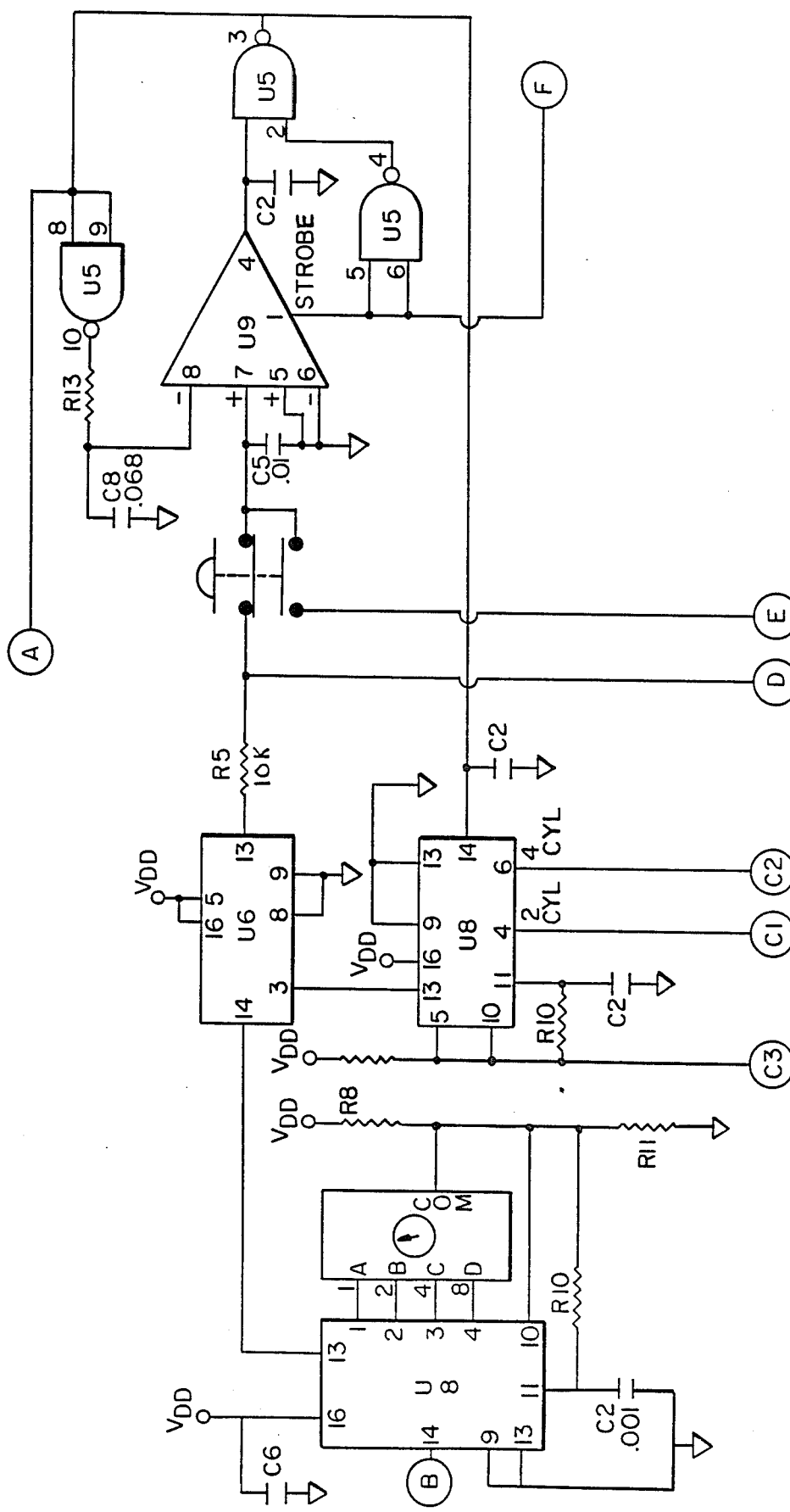
FIG. 4 is a detailed circuit diagram of the multiplier/divider circuit according to one embodiment of this invention and includes both a divider and a strobed phase locked loop multiplier circuit, and FIG. 5. is a detailed circuit diagram of a shutdown circuit according to this invention which includes a strobed comparison circuit.

Referring now to FIG. 4, the details of a suitable multiplier/divider circuit will be described. The wave shaped pick-up pulse is applied to pin 14 of integrated circuit U8 which may be a programmable counter. The divisor is set by switch COM to the number of cylinders in the engine being monitored. Hence, one pulse per revolution is output for two-cycle engines and one pulse per two revolutions for four-cycle engines. The advantage of this predivision is to make any signal source appear as one pulse per revolution (in the case of a two-cycle engine). Should the reference voltage be used for overspeed detection or data transmission, no additional calibration or adjustment is necessary. The predivided pulse is applied to the phase comparator circuit at pin 14 which may be the phase comparator of a typical phase locked loop integrated circuit U6. The other input to the phase comparator, applied at pin 3, is a divided pulse train being the speed pulse divided by the multiplication factor of the phase locked loop. The speed pulse is divided in U8. In the particular embodiment being described wherein the update period is 2.5 seconds, the divisor is either 24 or 48 depending upon whether the engine being monitored is either a two-cycle or four-cycle engine. The output of the phase comparator is a signal indicative of the frequency of the inputs and the phase difference, if any. A phase comparator circuit may simply be an "exclusive-or" circuit or may be circuits that detect the leading edge of the pulses in both input pulse trains and logic that produces the output indicative of frequency and phase difference. In the particular embodiment being described, integrated circuit MC14046BCP was used and has a phase comparator with leading edge detection in the phase locked loop. The output of the phase comparator is smoothed by a low-pass filter comprising R5 and C5 to provide a reference voltage that is indicative of the speed of the engine and provides the same signal no matter what the configuration of the engine. Phase locked loops have been used as multipliers in prior art tachometer circuits but the filtered output of the phase comparator cannot be used as a signal indicative of speed due to the drift due to temperature variations and the change in the supply voltage. The filtered output is typically applied to a voltage controlled oscillator (VCO), for example, the VCO provided upon the same integrated circuit upon which the phase comparator is found. This is the principal source of the drift and supply voltage problems making filtered output of the phase comparator a poor indicator of speed. According to this invention, the filtered output of the phase comparator or the voltage reference signal is applied at pin 7 to one input of a strobed comparator U9. The 1.024 kilohertz sampling signal is applied to pin 1 which is the strobe input to U9. The output is processed through output logic comprising two NAND gates on U5 to provide a speed pulse at pin 3 of U5 that is of a constant peak voltage and duration. The frequency of this pulses is indicative of the speed of rotation of the engine and such that the number accumulated in the update period (2.5 seconds) is equal to the speed in RPM. The speed pulses are isolated and filtered by a third NAND gate of U5 and resistor R13 and capacitor C8 to provide an analog feedback signal indicative of the frequency of the speed pulse. The analog feedback signal is applied to the strobed comparator at pin 8. Extremely low operating power levels are achieved by internally switching the comparator on for short periods of time. The comparator outputs a high at pin 4 when the strobe is applied at pin 1 and the feedback signal at pin 8 is less than the reference signal at pin 7. Thus configured the comparator circuit is an extremely low power voltage controlled oscillator. The circuit operates on a limited duty cycle input sampling basis to reduce power and is stabilized against temperature and other effects by the quartz crystal oscillator circuit.

Figure 5:
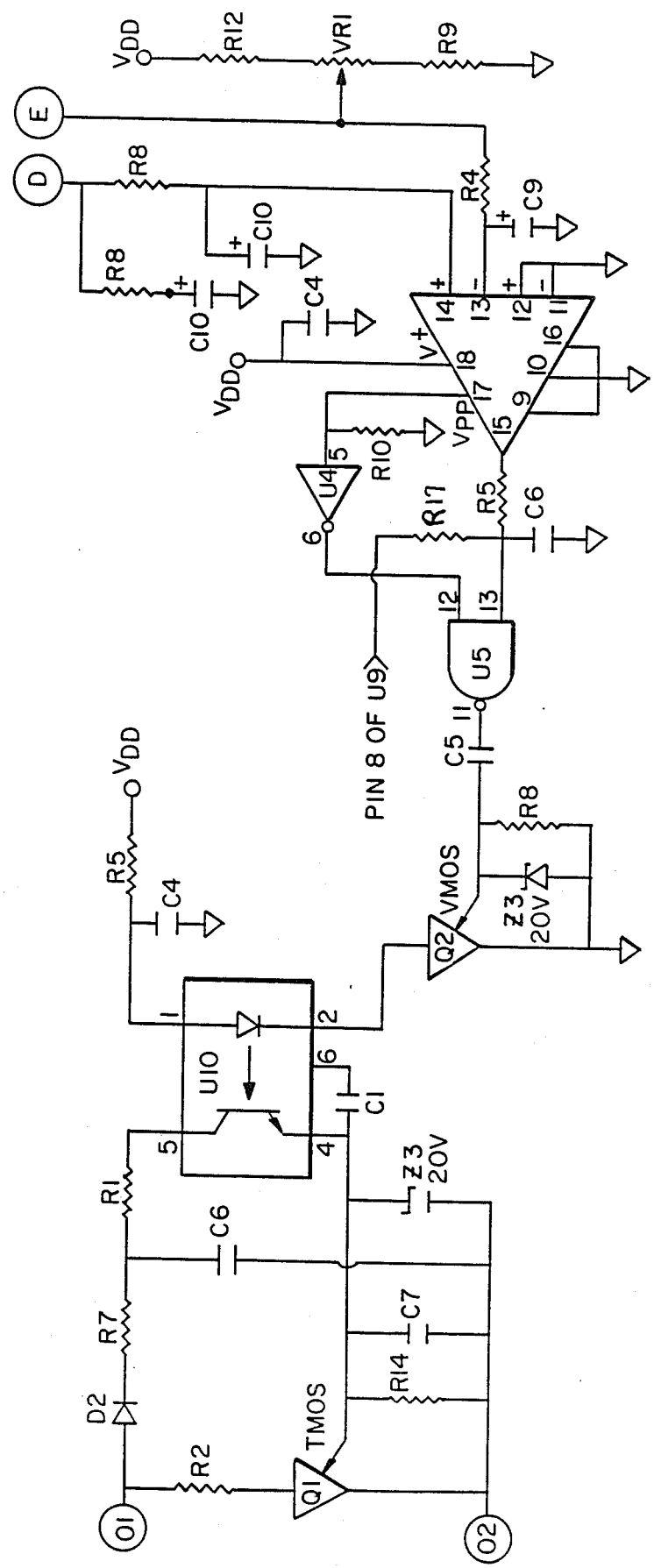

Referring now to FIG. 5, an overspeed shutdown circuit operable from the voltage reference signal is illustrated. The voltage reference signal may be used for this purpose because of its stability and accuracy with calibration. The voltage reference signal is applied as an input at pin 14 of the strobed comparator which is on the other half of integrated circuit U9 and is strobed by the sampling pulse applied at pin 1 (see FIG. 4). The other input at pin 13 is a maximum speed signal generated by a voltage divider comprised of resistors R12, R9 and potentiometer VR1. When the reference voltage at pin 14 exceeds the maximum speed voltage at pin 13, the comparator outputs a pulse indicating overspeed and a circuit latches the pules to create a shutdown signal.

Having thus described the invention with the detail and particularlity required by the Patent Laws, what is desired to be protected by Letters Patent is set forth in the following claims:

We claim:
1. A digital tachometer comprising:
   (a) means for receiving a pick-up pulse the frequency of which is related to the rotational speed of the engine and four outputting a wave shaped pick-up pulse, said means further comprising a means for filtering the pick-up pulses and regulating the filtered voltage to provide a d.c. output for powering the remainder of the tachometer,
   (b) a crystal controlled oscillator and divider circuit for providing update pulses at spaced time intervals of about 1 to 10 seconds and for providing precisely spaced sampling pulses at a frequency of about 1 to 5 kilohertz,
   (c) a display counter and driver for counting speed pulses indicative of speed between update pulses and latching the count until the next update pulse,
   (d) a numerical display for displaying the count currently latched in the display counter, and
   (e) a multiplier/divider circuit for receiving the wave shaped pick-up pulses and dividing them by the number of pulses per revolution to provide a pulse indicative of the rotational speed of the engine, and for multiplying the pulses in a sampled phase locked loop by a factor corresponding to the length of the period between update pulses to thus provide speed pulses for application to the display counter, said sampling phase locked loop being strobed by the sample pulses, said multiplier/divider circuit providing a d.c. output reference voltage indicative of speed in addition to the speed pulses which are each of equal duration and voltage but have varying intervals depending upon the speed of the engine.

2. The tachometer according to claim 1 wherein the sampled phase locked loop comprises means for dividing the speed pulses by the multiplication factor of the phase locked loop, a phase comparator for receiving as inputs the divided pick-up pulses and the speed pulses divided by the multiplying factor and outputting a signal indicative of frequency of the divided pick-up pulses and the phase difference between the two inputs, means for filtering the output of the phase comparator to produce the output reference voltage, means for filtering the speed pulses to provide an analog feedback signal, a first strobed comparison circuit that has as inputs the output reference signal and the analog feedback signal, said first strobed comparison circuit comparing the input signals thereto at the time it is strobed by each sampling pulse to output a speed pulse of constant duration and voltage if the analog feedback signal has dropped below the output reference voltage.

3. A tachometer according to claim 1 wherein the output reference signal is applied as one input to a second strobed comparison circuit strobed by said sampling pulse, the other input to the second strobed comparison circuit being a maximum speed reference voltage whereby when the output reference voltage exceeds the maximum speed reference voltage the second sampled comparator outputs a shutdown pulse, and means to latch the shutdown pulses to provide a shutdown signal.

4. A tachometer according to claim 3 further comprising a switch for applying the maximum speed reference voltage to the first strobed comparison circuit instead of the filtered output of the phase comparator whereby the numerical display will indicate the shutdown speed.

5. A tachometer according to claim 4 further including means for adjusting the maximum speed reference voltage.

6. A tachometer according to claim 1, 2, 3, 4 or 5 wherein the active components are low power CMOS integrated circuits.

* * * * *

UNITED STATES PATENT AND TRADEMARK OFFICE
CERTIFICATE OF CORRECTION

PATENT NO. : 4,777,435

DATED : October 11, 1988

INVENTOR(S) : Joseph M. Lepley and Richard D. Yohman

It is certified that error appears in the above-identified patent and that said Letters Patent is hereby corrected as shown below:

In the Abstract Line 3 "rotation" should read --rotational--.

Column 3 Line 20 "counter" should read --counters--.

Column 4 Line 64 "pulses" should read --pulse--.

Claim 1 a) Column 5 Line 38 "four" should read --for--.

Claim 3 Column 6 Line 40 "pulses" should read --pulse--.

Claim 6 Column 6 Line 51 "claim" should read --claims--.

Signed and Sealed this

Twenty-eighth Day of March, 1989

Attest:

DONALD J. QUIGG

Attesting Officer

Commissioner of Patents and Trademarks